United States Patent
Torashima et al.

(10) Patent No.: US 7,656,570 B2
(45) Date of Patent: Feb. 2, 2010

(54) OPTICAL DEFLECTOR AND OPTICAL INSTRUMENT USING THE SAME

(75) Inventors: Kazutoshi Torashima, Kawasaki (JP); Takahisa Kato, Tokyo (JP); Yukio Furukawa, Mountain View, CA (US); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 11/753,057

(22) Filed: May 24, 2007

(65) Prior Publication Data

US 2007/0279720 A1    Dec. 6, 2007

(30) Foreign Application Priority Data

May 30, 2006    (JP) .............................. 2006-149939

(51) Int. Cl.
  G02B 26/08    (2006.01)
(52) U.S. Cl. .................................. 359/224.1
(58) Field of Classification Search ... 359/223.1–226.1, 359/290, 291
  See application file for complete search history.

(56) References Cited

U.S. PATENT DOCUMENTS

| | | | |
|---|---|---|---|
| 4,859,846 | A | 8/1989 | Burrer |
| 6,201,226 | B1 | 3/2001 | Shimada et al. |
| 6,215,114 | B1 | 4/2001 | Yagi et al. |
| 6,327,087 | B1 | 12/2001 | Hashimoto et al. |
| 6,333,497 | B2 | 12/2001 | Shimada et al. |
| 6,335,522 | B1 | 1/2002 | Shimada et al. |
| 6,408,123 | B1 | 6/2002 | Kuroda et al. |
| 6,477,132 | B1 | 11/2002 | Azuma et al. |
| 6,900,925 | B2 | 5/2005 | Kato et al. |
| 7,038,834 | B2 | 5/2006 | Kato et al. |
| 7,095,159 | B2 * | 8/2006 | Machida ................ 310/323.02 |
| 7,123,400 | B2 * | 10/2006 | Murakami et al. .......... 359/298 |
| 7,271,943 | B2 | 9/2007 | Yasuda et al. |
| 2005/0088715 | A1 | 4/2005 | Yoda |
| 2005/0128552 | A1 | 6/2005 | Yasuda et al. |
| 2006/0152785 | A1 | 7/2006 | Yasuda et al. |
| 2006/0198006 | A1 | 9/2006 | Kato et al. |

(Continued)

FOREIGN PATENT DOCUMENTS

JP    6-269186    9/1994

(Continued)

*Primary Examiner*—Euncha P Cherry
(74) *Attorney, Agent, or Firm*—Fitzpatrick, Cella, Harper & Scinto

(57) ABSTRACT

An optical deflector includes a supporting member, a first movable element having a light deflecting element, at least one second movable element, at least one first torsion spring configured to support the first and second movable elements, for torsional oscillation about an oscillation axis, at least one second torsion spring configured to support the second movable element and the supporting member, for torsional oscillation about the oscillation axis, and a driving system configured to apply a driving force to at least one of the first and second movable elements, wherein a moment of inertia of the second movable element with respect to the oscillation axis is larger than a moment of inertia of the first movable element with respect to the oscillation axis, and wherein a length of the second movable element in a direction perpendicular to the oscillation axis is equal to or less than a length of the first movable element in a direction perpendicular to the oscillation axis.

11 Claims, 7 Drawing Sheets

U.S. PATENT DOCUMENTS

2007/0144867 A1    6/2007    Torashima et al.

FOREIGN PATENT DOCUMENTS

| JP | 2005-099760 | 4/2005 |
| JP | 2005-134665 | 5/2005 |
| JP | 2005-208578 | 8/2005 |
| JP | 2005-279863 | 10/2005 |
| JP | 2005-326464 A | 11/2005 |
| JP | 2006-130587 A | 5/2006 |
| KR | 10-2005-0043423 | 5/2005 |

* cited by examiner

OPTICAL DEFLECTOR AND OPTICAL INSTRUMENT USING THE SAME

FIELD OF THE INVENTION AND RELATED ART

This invention relates to an optical deflector and an optical instrument such as an image forming apparatus or a display device, for example, using such optical deflector. The optical deflector of the present invention is suitably usable in a projection display wherein an image is projected based on deflective scan of light, or an image forming apparatus such as a laser beam printer or digital copying machine having an electrophotographic process, for example.

With regard to such optical deflectors, various types of optical scanning systems or optical scanning devices wherein a movable element having a reflection surface is sinusoidally oscillated to deflect light have been proposed. Optical scanning systems with an optical deflector sinusoidally oscillated based on a resonance phenomenon have advantageous features, as compared with scanning optical systems using a rotary polygonal mirror (polygon mirror), such as follows. That is, the optical deflector can be made quite small in size; the power consumption is low; and particularly those optical deflectors made of Si monocrystal and produced by semiconductor processes are theoretically free from metal fatigue and have good durability.

An example of optical deflectors using resonance phenomenon is an actuator such as shown in FIG. 8 (see Patent Document No. 1).

In FIG. 8, the actuator generally denoted at 100 comprises a first mass member 1, a second mass member 2 and a pair of supporting members 3. These components are made of silicon, for example. A light reflecting element 21 is provided at the surface of the second mass member 2 of the actuator. As shown in FIG. 8, the actuator 100 has a pair of first resiliently coupling members 4 for coupling the first mass member 1 and the supporting members 3, for pivotal motion of the first mass member relative to the supporting members 3. Additionally, it has a pair of second resiliently coupling members 5 for coupling the first mass member 1 and the second mass member 2, for pivotal motion of the second mass member 2 relative to the first mass member 1. Denoted at 6 are opposed substrates.

Such two-degree-of-freedom oscillation type actuator as described has two resonance frequencies (natural oscillation modes) wherein the amplitude of the first and second mass members 1 and 2 is large, and one antiresonant frequency (natural oscillation mode) wherein the amplitude of the first mass member 1 is approximately equal to zero. In the actuator of the structure described above, by using lower one of the two frequencies for the driving, the displacement angle (rotational angle) of the second mass member 2 can be made large while keeping the amplitude of the first mass member 1 small.

Some of the optical deflectors based on resonance phenomenon uses a method in which two or more natural oscillation modes in the direction of torsional oscillation are excited simultaneously to perform the optical scan different from sinusoidal-wave optical scan (see Patent Document No. 2).

FIG. 9 is a plan view for explaining such optical deflector. A movable element 1001 of planar shape is supported at its top and bottom, as viewed in FIG. 9, by two torsion springs 1011a and 1011b. A movable element 1002 of frame-like shape supports these torsion springs 1011a and 1011b inward, while the top and bottom thereof as viewed in FIG. 9 are supported by two torsion springs 1012a and 1012b. A supporting frame 1021 having a frame-like shape supports the torsion springs 1012a and 1012b inward. The movable elements 1001 and 1002 and the torsion springs 1011 and 1012 have two natural oscillation modes having a frequency ratio 1:2. By exciting these two modes simultaneously, the optical deflector is driven through sawtooth-wave like oscillation, and optical scanning having small change in angular speed is provided. Denoted at 1000 is a plate member, and denoted at 1041 is a permanent magnet.

[Patent Documents]

No. 1: Japanese Laid-Open Patent Application No. 2005-099760 and corresponding U.S. Patent Application Publication No. 2005/088715(A1).

No. 2: Japanese Laid-Open Patent Application No. 2005-208578 and corresponding U.S. Patent Application Publication No. 2006/152785(A1).

SUMMARY OF THE INVENTION

In an electrophotographic process of a laser beam printer or the like, a photosensitive member is scanned by a laser beam to form an image thereon. Where an optical deflector having plural movable elements and plural torsion springs is used to perform the optical scan with a large displacement angle, it is desirable that plural natural oscillation modes are placed in a desired relationship and, moreover, the displacement angle is stable. However, in optical deflectors having plural movable elements and plural torsion springs, due to dispersion of process precision or the like, it is not easy to set plural natural oscillation modes in a desired relationship. Furthermore, if the displacement angle of the optical deflector is large, because of air resistance or the like, it is not easy to keep the displacement angle stable.

In accordance with an aspect of the present invention, there is provided an optical deflector, comprising: a supporting member; a first movable element having a light deflecting element; at least one second movable element; at least one first torsion spring configured to support said first and second movable elements, for torsional oscillation about an oscillation axis; at least one second torsion spring configured to support said second movable element and said supporting member, for torsional oscillation about the oscillation axis; and a driving system configured to apply a driving force to at least one of said first and second movable elements; wherein a moment of inertia of said second movable element with respect to (i.e. about) said oscillation axis is larger than a moment of inertia of said first movable element with respect to said oscillation axis, and wherein a length of said second movable element in a direction perpendicular to the oscillation axis is equal to or less than a length of said first movable element in a direction perpendicular to the oscillation axis.

In accordance with another aspect of the present invention, there is provided an optical instrument, comprising: a light source; an optical deflector as recited above; and one of a photosensitive member and an image display member; wherein said optical deflector is configured to deflect light from said light source and to direct at least a portion of the deflected light onto said photosensitive member or image display member.

In accordance with the present invention, the moment of inertia of the second movable element or the length thereof in a direction perpendicular to the oscillation axis is set as described above. This accomplishes an optical deflector in which plural natural oscillation modes of the optical deflector can be easily adjusted into a desired relationship and, furthermore, even if the displacement angle is relatively large, the displacement angle is held stable. In an optical instrument using this optical deflector, a large but stable displacement angle is accomplished by the present invention.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Figure 1A:
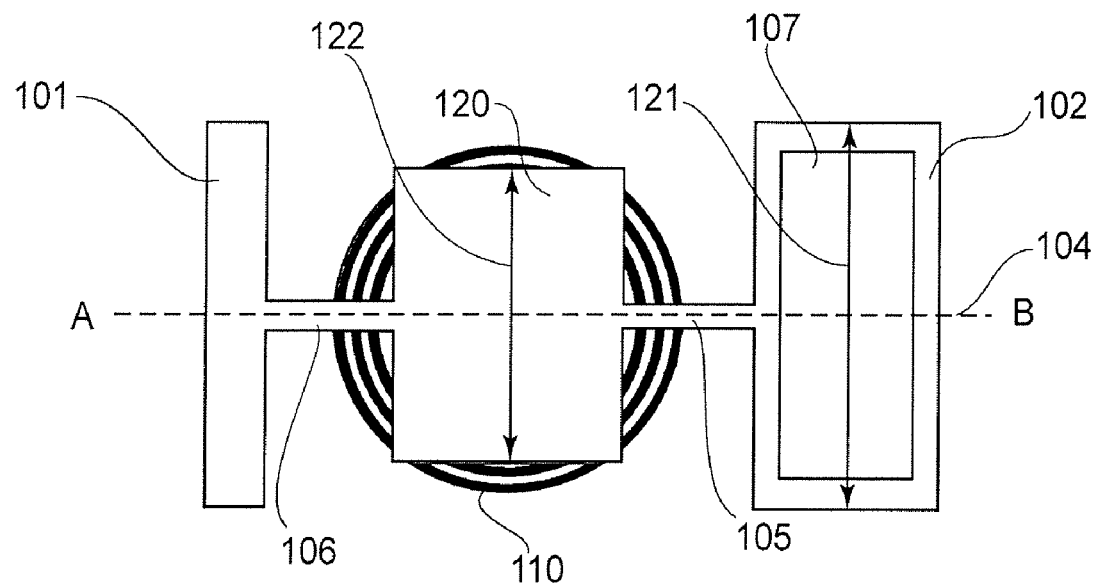
FIG. 1A is a plan view of an optical deflector according to an embodiment of the present invention as well as a first working example of the present invention.
Figure 1B:
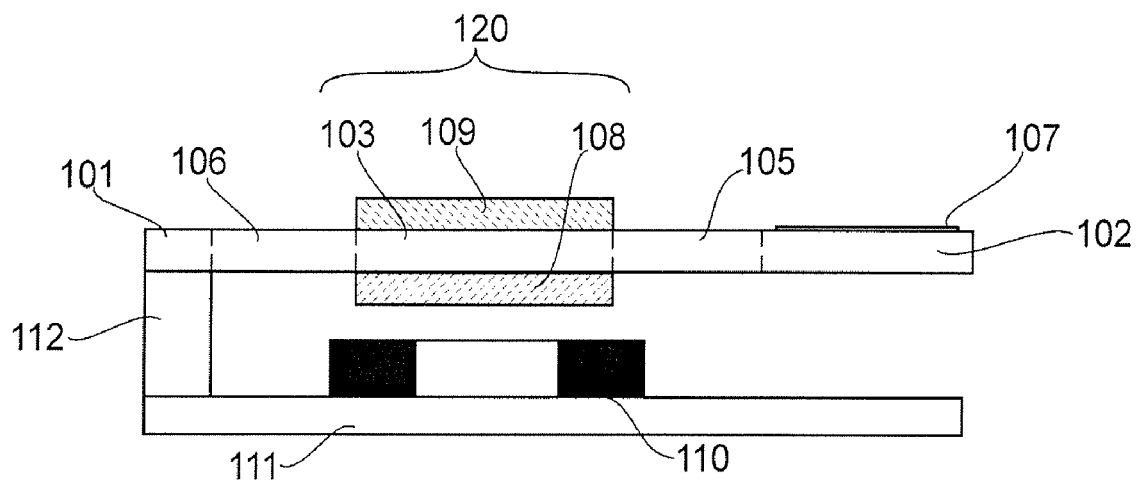
FIG. 1B is a sectional view of the optical deflector of FIG. 1A, taken along a line A-B in FIG. 1A.

Referring first to FIGS. 1A and 1B, an embodiment of an optical deflector according to the present invention will be described. FIG. 1A is a plan view of an optical deflector according to this embodiment, and FIG. 1B is a section taken along a line A-B in FIG. 1A. The optical deflector of this embodiment may comprise a supporting member 101, a first movable element 102 having a reflection surface 107 which may be a light deflecting element, a second movable element 120, and torsion springs 105 and 106 for resiliently coupling the supporting member 101, first movable element 102 and second movable element 120 about an oscillation axis 104. The second movable element 120 may include a main body 103, a mass adjusting member 109 such as a metal or the like for adjusting the mass, placed on the top surface of the main body, and a magnet (hard magnetic material) 108 provided at the bottom of the main body. The first movable element 102 may be resiliently supported by the second movable element 120 through the first torsion spring 105, for torsional oscillation about the oscillation axis 104. The second movable element 120 may be resiliently supported by the supporting member 101 through the second torsion spring 106, for torsional oscillation about the oscillation axis 104. The supporting member 101 may be fixed to a stationary base plate 111 through a spacer 112.

The optical deflector of this embodiment may further comprise a driving unit for driving the first and second movable elements 102 and 120, and a drive control unit for controlling the driving unit. Typically, the driving unit may comprise means for applying a torque to at least one of the first and second movable elements 102 and 120 to produce resonance drive of them. Here, the driving unit may comprise a magnet 108 and a coil 110 for applying a torque to the second movable element 120 to produce resonance drive of the first and second movable elements 102 and 120. The magnet 108 may be disposed at the second movable element 120, and the coil 110 may be mounted on the base plate 110. The drive control unit may be, for example, a drive control circuit for supplying a driving current based on a driving signal, to the coil 110 of the driving unit. The driving unit may be based on an electromagnetic method in this example, or it may use an electrostatic method or piezoelectric method, for example.

The optical deflector of this embodiment may have two natural oscillation modes of torsion, having different frequencies. By means of the drive control unit and the driving unit (108, 110), these two natural oscillation modes (first-order natural oscillation mode and second-order natural oscillation mode) may be excited simultaneously or separately. This produces torsional resonance drive of the first and second movable elements 102 and 120 about the oscillation axis 104, at a relatively large displacement angle with respect to the supporting member 101. Where these two natural oscillation modes of torsion are exited at the same time, the optical deflector of this embodiment is driven by oscillation based on superposed sinusoidal waves.

The optical deflector of this embodiment may have a feature that the inertia moment $I_2$ of the second movable element 120 with respect to the oscillation axis 104 may be made larger than the inertia moment $I_1$ of the first movable element 102 with respect to the oscillation axis 104. Furthermore, the length 122 of the second movable element 120 in a direction perpendicular to the oscillation axis 104 may be made equal to or less than the length 121 of the first movable element 102 in a direction perpendicular to the oscillation axis 104. Where the shape of the first movable element 102 or second movable element 120 is not rectangular (including square), the length in a direction perpendicular to the oscillation axis 104 may refer to the length being perpendicular to the oscillation axis 104 and up to the point most remote from the oscillation axis 104.

The function and operation of this embodiment will be explained below. In the optical deflector according to this embodiment, the inertia moment $I_2$ of the second movable element 120 (as connected to the supporting member 101) with respect to the oscillation axis 104 may be made larger than the inertia moment $I_1$ of the first movable element 102 (as connected to the second movable element 120) with respect to the oscillation axis 104. This structure enables easy adjustment of two natural oscillation modes of oscillation, bringing them into a desired relationship.

For example, if the inertia moments of the first and second movable elements 102 and 120 have a relationship of $I_1 > I_2$, changing the inertia moment $I_1$ would cause a large change of both of the two natural oscillation modes. Also, changing the inertia moment $I_2$ would similarly result in a large change of both of the two natural oscillation modes. Hence, it is very difficult to adjust the two natural oscillation modes of torsion individually.

On the other hand, if the inertia moments of the first and second movable elements 102 and 120 have a relationship of $I_1 < I_2$, by changing the inertia moment $I_1$ or $I_2$, one of the first-order natural oscillation mode and second-order natural oscillation mode of the optical deflector can be mainly changed. Preferably, $I_2$ should be four times or more as large as $I_1$.

Thus, even if two natural oscillation modes of torsion do not satisfy a desired relationship due to dispersion of shape caused in the manufacture of the optical deflector, for example, by adjusting at least one of the inertia moments $I_1$ and $I_2$, these two natural oscillation modes of torsion can be adjusted into a desired frequency relationship.

Even if the frequencies $f_1$ and $f_2$ of the natural oscillation modes are deviated from target frequencies due to error factors such as process tolerance of the oscillating system including the first and second movable elements, these frequencies $f_1$ and $f_2$ can be well adjusted based on the relationship of the inertia moments described above. Details are as follows.

In the oscillating system of this embodiment satisfying the relationship of inertia moments described above, the frequencies $f_1$ and $f_2$ of the first- and second-order natural oscillation modes about the oscillation axis 104 can be approximated by the relation given by Equation (1) below, wherein $I_1$ is the moment of inertia of the first movable element 102, $I_2$ is the moment of inertia of the second movable element 120, and $K_1$ and $K_2$ are spring constants of the first and second torsion springs 105 and 106, respectively. Furthermore, as regard the double sign at the right-hand side, a negative sign is chosen in the case of $f_1$ and a positive sign is chosen in the case of $f_2$.

$$(2\pi f_{1,2})^2 = \frac{1}{2}\left(\frac{K_1 + K_2}{I_2} + \frac{K_1}{I_1}\right) \mp \frac{1}{2}\sqrt{\left(\frac{K_1 + K_2}{I_2} + \frac{K_1}{I_1}\right)^2 - 4\frac{K_1 K_2}{I_1 I_2}} \quad (1)$$

It follows from Equation (1) that, if the difference between $I_1$ and $I_2$ is not large, both the frequencies $f_1$ and $f_2$ will change in accordance with the increase/decrease of $I_1$ and $I_2$. Therefore, in order to adjust the frequencies $f_1$ and $f_2$ toward desired frequencies, respectively, the amount of increase/decrease of $I_1$ and $I_2$ has to be enlarged, or the adjustment of the frequency toward a desired value becomes difficult to do.

On the other hand, in Equation (1), if $I_1 \ll I_2$ (for example, $I_2$ is four times or more as large as $I_1$), the change of frequencies $f_1$ and $f_2$ resulting from adjustment of the inertia moments $I_1$ and $I_2$ of the two movable elements has such characteristic that the frequency $f_1$ changes in response to the increase/decrease of $I_1$ while the frequency $f_2$ changes in response to the increase/decrease of $I_2$; whereas the increase/decrease of $I_1$ causes little change of the frequency $f_2$ while the increase/decrease of $I_2$ causes little change of the frequency $f_1$.

When Equation (1) above is applied to an oscillating system having two second movable elements 220a and 220b such as shown in FIG. 4, the sum of inertia moments of these second movable elements 220a and 220b may be used as the inertia moment $I_2$ for the second movable element. Furthermore, with regard to the spring constant $K_1$ of the first torsion spring, the sum of the spring constants of the first torsion springs 205a and 205b may be used. Similarly, with regard to the spring constant $K_2$ of the second torsion spring, the sum of the spring constants of the second torsion springs 206a and 206b may be used.

Taking into consideration the characteristics of the oscillating system as described above, the oscillating system of this embodiment may be arranged so that the permanent magnet 108 and the mass adjusting member 109 are provided only at the second movable element 120, by which the relation $I_1 \ll I_2$ is satisfied while assuring improved scanning stability. Particularly, setting the magnet 110 only at the second movable element 120 does enable that, while making use of the magnet as a torque generating source, the mass of the magnet is used as the moment of inertia to assure the relation $I_1 \ll I_2$.

In the oscillating system of this embodiment, based on laser beam projection, the first movable element 102 and/or the mass adjusting member 109 may be partly removed to decrease the appropriate amount of $I_1$ and $I_2$, by which the frequencies $f_1$ and $f_2$ can be adjusted to satisfy a desired relationship (i.e., a relation defined by Equation (2) or Equation (4) to be described below). Hence, even if the frequency of natural oscillation mode is deviated from a desired value, this can be met appropriately. Namely, in that occasion, by measuring the amplitude of the oscillating system by sweeping the driving frequency, any deviation of the frequencies $f_1$ and $f_2$ of the natural oscillation modes from their target values can be determined. Based on the thus measured values, necessary adjusting amounts $\delta I_1$ and $\delta I_2$ can be calculated in accordance with Equation (1). Then, by partly removing the first movable element 103 and/or the mass adjusting member 109 by use of a laser beam, for example, the frequencies $f_1$ and $f_2$ can be adjusted exactly as desired.

Particularly, with regard to the adjusting amount $\delta I_2$, by sharing the function for providing the moment of inertia to the second movable element 120 between the magnet 108 and the mass adjusting member 109, the adjusting amount $\delta I_2$ per volume to be removed by the laser beam machining is enlarged as compared with a case where a portion of the second movable element 120 itself is removed. Hence, the frequency adjustment of natural oscillation mode based on laser beam machining can be made fast, and inexpensive production is assured. Furthermore, since the adjusting amount $\delta I_2$ per volume to be removed is large, the frequency adjustable range can be made large even if the width of the second movable element 120 is small. With these features, not only the scanning stability is improved but also the oscillating system can be made small in size. Therefore, where the device is produced from a monocrystal silicon substrate in accordance with the semiconductor manufacturing method, the production cost is lowered more.

On the other hand, if the length 122 of the second movable element 120 in a direction perpendicular to the oscillation axis 104 is made longer than the length 121 of the first movable element 102 in a direction perpendicular to the oscillation axis 104, the air resistance applied to the second movable element 120 becomes large. In consideration of this, the length of the second movable element 120 in the direction perpendicular to the oscillation axis 104 may preferably be made shorter than the length of the first movable element 102 in the direction perpendicular to the oscillation axis 104. This reduces the air resistance and improves the displacement angle stability. Hence, even if the optical deflector is driven at a large displacement angle, good displacement angle stability is assured.

Furthermore, by making the inertia moment of the second movable element 120 large, the amplitude amplification factor (resonance sharpness Q-value) of the natural oscillation modes can be improved. The displacement angle stability is improved by enlarging the inertia moment to increase the amplitude amplification factor thereby to reduce dispersion of oscillation energy. Hence, even if the optical deflector is driven at a large displacement angle, good displacement angle stability is assured.

In the optical deflector of this embodiment, the length of the second movable element 120 in a direction parallel to the oscillation axis 104 may be made equal to or less than the length of the first movable element 102 in a direction parallel to the oscillation axis 104. With this structure, since the air resistance of the second movable element 120 during torsional oscillation is reduced further, the displacement angle stability is improved.

Furthermore, in the optical deflector of this embodiment, the second movable element 120 may have a thickness larger than the first movable element 102. With this structure, the inertia moments of the first and second movable elements 102 and 120 can easily be set to satisfy a relationship of $I_1 < I_2$.

The optical deflector of this embodiment may have such structure that the supporting member 101 and one of plural torsion springs are connected to each other. With this structure, even if the fixing point of the supporting member 101 is deformed due to any unwanted force resulting from any thermal stress or a stress produced when the supporting member 101 is fixed, little stress will act on the first and second movable elements 102 and 120. Hence, degradation of flatness (surface precision) of the reflection surface 107 is avoided. Particularly, when the second movable element 120 consists of a single element, since the air resistance is quite small, the displacement angle stability is improved and, in addition to this, an optical deflector being small in size is accomplished.

The optical deflector of this embodiment may have such structure that the first and second movable elements 102 and 120 are connected, at the opposite ends of plural torsion springs, to the supporting member. With this structure, because of the support at the opposite ends (each torsion spring is fixed at two points), unwanted oscillation other than torsion spring can be more assuredly avoided during the torsion oscillation. Particularly, even if the optical deflector is equipped with a movable element having a large inertia moment which easily causes unwanted oscillating during the torsion oscillation, occurrence of such unwanted oscillation is well avoided.

The optical deflector of this embodiment may have such structure that the first movable element 102 is provided by a single component or single material. With this structure, since the first movable element 102 having a reflection surface 107 is made from a single component, deformation of the reflection surface 107 is avoided more assuredly.

The optical deflector of this embodiment may have such structure that the second movable element 120 is provided by plural components, as described hereinbefore. With this structure, since the second movable element 120 may include components having a large moment of inertia (e.g., mass adjusting member 109 or magnet 108), the inertia moment of the second movable element 120 can be easily made large. Hence, the inertia moments of the first and second movable elements 102 and 120 can easily be set to satisfy a relation $I_1 < I_2$ (see first working example discussed later).

The optical deflector of this embodiment may have such structure that the aforementioned plural components of the second movable element 120 are disposed at positions sandwiching the oscillation axis 104 therebetween. For example, as shown in FIGS. 1A and 1B, components such as metal members may be disposed at positions which are present along the direction of a normal to the flat surface portion of the second movable element 120 and which sandwich the oscillation axis 104 therebetween. In that occasion, the inertia moment of the second movable element 120 can be made quite large. Alternatively, components such as metal members may be disposed at positions which are in parallel to the flat surface portion of the second movable element and which sandwich the oscillation axis 104 therebetween. In this case as well, the inertia moment of the second movable element 120 can be made very large. Hence, with these structures, the inertia moment $I_2$ of the second movable element can more easily be made large.

The optical deflector of this embodiment may have such structure that the gravity center of the second movable element 120 is aligned with the oscillation axis 104. With this structure, unwanted oscillation other than torsional oscillation, during the torsional oscillation, can be more assuredly avoided (see third working example discussed later). Particularly, even if the optical deflector has a movable element having a large inertia moment which easily causes unwanted oscillating during the torsion oscillation, occurrence of such unwanted oscillation is well avoided.

The optical deflector of this embodiment may have such structure that at least one of the aforementioned plural components is made of metal. With this structure, since the second movable element 120 includes a metal having a large specific gravity, the inertia moment of the second movable element 120 can easily be made large. Hence, the inertia moments of the first and second movable elements 102 and 120 can easily be set to satisfy a relation $I_1 < I_2$.

The optical deflector of this embodiment may have such structure that at least one of the aforementioned plural components is a hard magnetic material 108, as described above. With this structure, the inertia moment of the second movable element 120 can be made large on one hand, and, if the driving unit is based on an electromagnetic force, a large driving force can be produced by a small electric current, on the other hand. Thus, the power consumption is slowed down.

The optical deflector of this embodiment may have such structure that the first movable element, second movable element, torsion springs and supporting member are integrally made from monocrystal silicon. In that occasion, these can be produced in the same procedure based on the micromachining method using semiconductor manufacturing processes. Thus, the optical deflector can be manufactured with a very high machining precision.

The optical deflector of this embodiment may have at least two natural oscillation modes of different frequencies, and the first movable element 102 may be torsionally oscillated about the oscillation axis 104 in accordance with these at least two natural oscillation modes, simultaneously. With this arrangement, the optical deflector is driven based on the oscillation of superposed sinusoidal waves.

The optical deflector of this embodiment may have such structure that the frequency of one of two different natural oscillation modes is approximately double or triple the frequency of the other mode. In such case, the inertia moment $I_2$ of the second movable element should be 1.8 times or more as large as the inertia moment $I_1$ of the first movable element. This enables driving the first movable element based on sawtooth-wave like (or chopping-wave like) oscillation (see first working example discussed later).

The optical deflector of this embodiment may have such structure that, when a plane perpendicular to the oscillation axis 104 is defined, at least one of the first and second movable elements has a shape intersecting with that plane at plural locations (see third working example discussed later). With this structure, even if the movable element has a relatively small area, the inertia moment thereof can be made large.

Additionally, adjustment of the mass is easy and thus the inertia moment can be adjusted relatively easily.

An optical instrument such as a display or printer having an optical deflector according to this embodiment of the present invention may includes a light source, the optical deflector mentioned above, and one of a photosensitive member and an image display member. The optical deflector may deflect light from the light source and to direct at least a portion of the deflected light onto the photosensitive member or image display member.

Next, the present invention will be described in greater detail with reference to specific working examples of the same.

FIRST WORKING EXAMPLE

A first working example of the present invention will be described below. This working example directly corresponds to the embodiment described above. FIGS. 1A and 1B show the structure of an optical deflector according to the first working example. FIG. 1A is a plan view of the optical deflector, and FIG. 1B is a section taken along a line A-B in FIG. 1A. The optical deflector comprises a supporting member 101, a first movable element 102 having a reflection surface 107, a second movable element 120, and torsion springs 105 and 106 for resiliently coupling the supporting member 101, first movable element 102 and second movable element 120 about an oscillation axis 104. The optical deflector further comprises a driving unit for applying a torque to the second movable element 120 to produce resonance drive of the first and second movable elements 102 and 120, and a drive control unit for controlling the driving unit. The driving unit includes a magnet 108 disposed at the second movable element 120 and a coil 110 mounted on a base plate 110.

The first movable element 102 has a length 121 of 3 mm in a direction perpendicular to the oscillation axis 104 and a size of 1 mm in a direction parallel to this axis. The second movable element 120 has a length 122 of 2.8 mm in a direction perpendicular to the oscillation axis 104 and a size of 1.5 mm in a direction parallel to this axis. The supporting member 101, silicon portion (main body portion) 103 of the first and second movable elements 102 and 120, and torsion springs 105 and 106 are integrally made from a monocrystal silicon substrate in accordance with photolithography and dry etching of the semiconductor manufacturing method. Hence, an optical deflector having highest machining precision and being quite small in size can be produced.

The reflection surface 107 of the first movable element 107 is made of aluminum, and it is formed by vacuum vapor deposition. As a matter of course, it may be made of any other material such as gold or copper, for example. A protection film may be provided at the topmost surface thereof. The second movable element 120 has a silicon portion 103, a hard magnetic material 108, and a copper member (mass adjusting member) 109.

The driving principle of this working example will be explained. The hard magnetic material 108 is being polarized (magnetized) in a direction perpendicular to the oscillation axis 104. The optical deflector of this working example has two natural oscillation modes of torsion, having different frequencies $f_1$ and $f_2$. As the drive control unit and the driving unit apply an AC current to the coil 110, an electromagnetic force is produced and it is applied to the hard magnetic material 108. In response, the two natural oscillation modes of torsion are excited simultaneously. As a result of this, torsional resonance drive of the first and second movable elements 102 and 120 about the oscillation axis 104 is produced with a relatively large displacement angle relative to the supporting member 101.

The driving principle of sawtooth-wave-like oscillation of the optical deflector according to this working example will be explained in greater detail. With regard to the torsional oscillation about the torsional axis 104, the oscillating system of the optical deflector of this example has a first-order natural oscillation mode of a frequency $f_1$ and a second-order natural oscillation mode of a frequency $f_2$ which is approximately twice a reference frequency. This oscillating system can be treated as an oscillating system having a degree of freedom of "2" with respect to the torsional oscillation.

On the other hand, the fixed coil 110 drives the oscillating system in accordance with a combined driving signal based on the reference frequency $f_0$ (target driving frequency as determined by the specifications of the system application) and a frequency $2f_0$ which is twice the reference frequency. The reference frequency $f_0$ and the natural oscillation mode frequencies $f_1$ and $f_2$ have a relationship described below, and the optical deflector of this example performs sinusoidal-wave combined drive with low power consumption, based on a large dynamic-to-static modulus ratio (amplitude amplification factor) of natural oscillation mode.

Particularly, the natural mode frequency $f_1$ is designed close to the reference frequency $f_0$. Here, if the mode damping ratio (which represents sharpness of the peak, at the natural mode frequency, of the dynamic-to-static modulus ratio frequency characteristic curve and which is approximately equal to ½Q) of the first-order and second-order natural oscillation modes is denoted by $\gamma_1$ and $\gamma_2$, respectively, the range thereof is expressed as follows.

$$f_0(1-2\gamma_1) < f_1 < f_0(1+2\gamma_1) \tag{2}$$

Furthermore, in this specification, the detuning $\Delta$ regarding the frequency ratio of the frequencies $f_1$ and $f_2$ is defined as follows, and the range for "approximately multiple by an integer" is determined. The detuning $\Delta$ is defined by $\Delta=N(f_1/f_2)$ as an index for that the frequencies $f_1$ and $f_2$ of the oscillating system are in "N times" relationship. For example, in this specification, the words "approximately twice" refer to the range expressed by Equation (3) below.

$$-2(\gamma_1+\gamma_2)+1 < 2\frac{f_1}{f_2} < 2(\gamma_1+\gamma_2)+1 \tag{3}$$

Additionally, in this working example, the frequency ratio is in the following range.

$$-(\gamma_1+\gamma_2)+1 < 2\frac{f_1}{f_2} < (\gamma_1+\gamma_2)+1 \tag{4}$$

In the oscillating system of this working example, $\gamma_1$ is abut 0.001 and $\gamma_2$ is about 0.00025. In this example, by means of the fixed coil 110, oscillations of $f_0$ and $2f_0$ are excited at around the peaks of two natural oscillation modes, and the oscillating system is driven based on it. Particularly, in the range defined by Equation (2), with regard to the oscillation of frequency $f_0$ which is a main component of the consumed electric power for the sinusoidal-wave combined drive, a range having large dynamic-to-static modulus ratio (amplitude amplification factor) of the first-order natural oscillation mode can be used. Therefore, the power consumption of the optical deflector is lowered.

Figure 2:
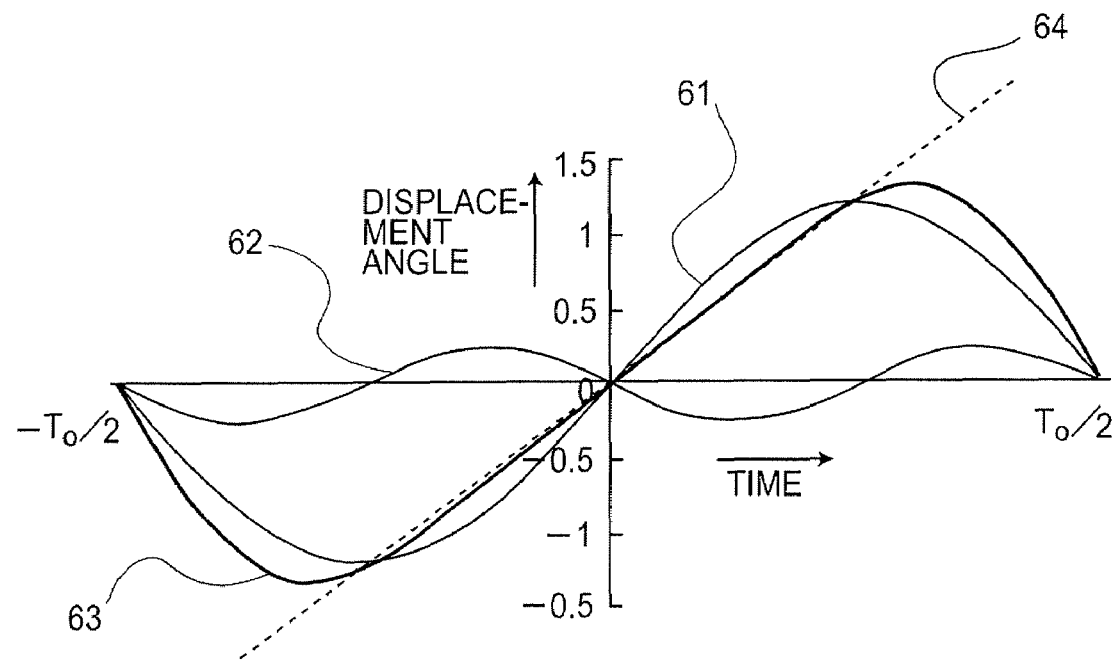
FIG. 2 is a graph for explaining the displacement angle of light scanningly deflected by the optical deflector according to the first working example of the present invention.

The driving method will be explained in more detail. FIG. 2 is a graph with time t taken on the axis of abscissa, and it explains the displacement angle of the first oscillator 102 during torsional oscillation of a frequency $f_0$ (in this specification, since the displacement angle of reciprocal oscillation of the movable element and the displacement angle of light deflectively scanned by the optical deflector are different only with respect to the constant, they are treated as equivalent). Specifically, FIG. 2 illustrates the portion corresponding to one cycle $T_0$ of the torsional oscillation of the first movable element 102 ($-T_0/2 < X < T_0/2$).

Curve 61 depicts the component of reference frequency $f_0$, of the driving signal that energizes the fixed coil 110. It is a sinusoidal oscillation which reciprocally oscillates within the range of largest amplitude $\pm\phi_1$ and is expressed by Equation (5) below, where time is t and angular frequency is $w_0=2\pi f_0$.

$$\theta_1 = \phi_1 \sin[w_0 t] \qquad (5)$$

On the other hand, curve 62 depicts the frequency component twice the reference frequency $f_0$, and it is sinusoidal oscillation which oscillates in the range of largest amplitude $\pm\phi_2$ and is expressed by Equation (6) below.

$$\theta_2 = \phi_2 \sin[2w_0 t] \qquad (6)$$

Curve 63 depicts the displacement angle of the torsional oscillation of the first movable element 102 produced as a result of the drive described above. With regard to the torsional oscillation about the torsional axis 104, the optical deflector has a natural oscillation mode of frequency $f_1$ and a second-order natural oscillation mode of frequency $f_2$, being adjusted around the reference frequency $f_0$ and the frequency $2f_0$ twice the reference frequency, as described hereinbefore. Hence, both resonance excited by the driving signal corresponding to $\theta_1$ and resonance excited by the driving signal corresponding to $\theta_2$ occur in the optical deflector. Namely, the displacement angle of the first movable element 102 in curve 63 is based on the oscillation provided by superposition of these two sinusoidal oscillations; that is, a sawtooth-wave-like oscillation that can be expressed by Equation (7) below is produced.

$$\theta = \theta_1 + \theta_2 = \phi_1 \sin[w_0 t] + \phi_2 \sin[2w_0 t] \qquad (7)$$

Figure 3:
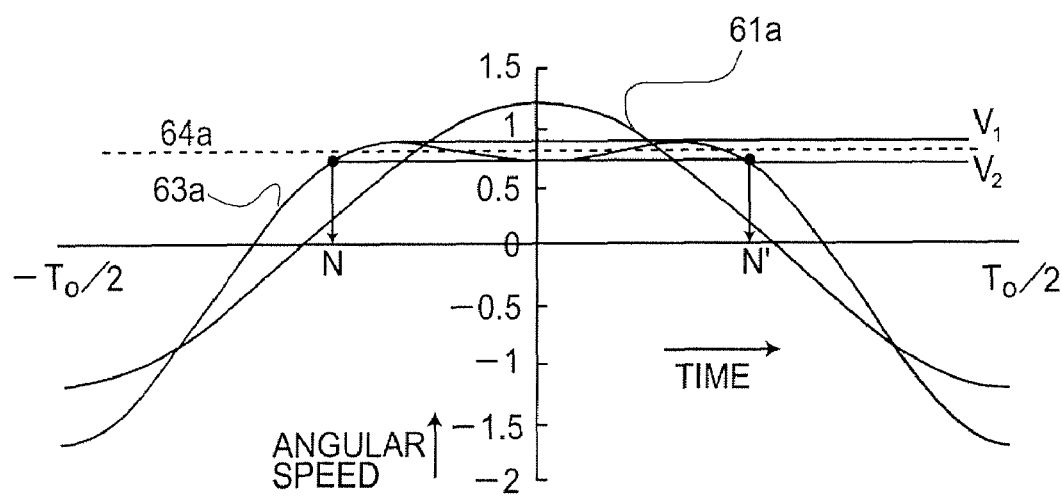
FIG. 3 is a graph for explaining the angular speed of light scanningly deflected by the optical deflector according to the first working example of the present invention.

FIG. 3 shows curves 61a and 63a and a straight line 64a, obtained by differentiating the curves 61 and 63 and a straight line 64 of FIG. 2, and it illustrates the angular speed of these curves. As compared with the curve 61a which depicts the angular speed of sinusoidal oscillation of reference frequency $f_0$, the curve 63a that depicts the angular speed of sawtooth-wave-like reciprocal oscillation of the first movable element 102 has a feature that in the section N-N' the angular speed is kept within the range having upper and lower limits corresponding to the angular speed $V_1$ at the maximum and the angular speed $V_2$ at the minimum, respectively. Thus, if, in the application based on optical deflective scan using the optical deflector, $V_1$ and $V_2$ are present within the allowable error range of angular speed from the straight line 64a which corresponds to constant angular-speed scan, the section N-N' can be regarded as a substantially constant angular-speed scan region.

As described above, as compared with the oscillation based on the displacement angle following sinusoidal waves, the sawtooth-wave reciprocal oscillation does provide, for the angular speed of deflective scan, a much wider region in which the angular speed is substantially constant. Thus, the ratio of available region to the whole deflective scan region is notably enlarged. Furthermore, the sawtooth-wave based drive ensures regular intervals of scan lines, and this is quite advantageous in the application to printers, for example.

Although the foregoing description has been made with reference to an example wherein the frequencies $f_1$ and $f_2$ of natural oscillation modes have a "double" relationship that the latter is approximately twice the former, a "triple" relationship wherein the latter is approximately three times the former may be set. In that occasion, like the "double" relationship, through the oscillation based on superposition of sinusoidal waves, chopping-wave-like oscillation is provided. Since this enables utilization of reciprocal scan of light, the number of scan lines at a certain available frequency can be doubled.

When the driving as of this working example is going to be made, plural natural oscillation modes should be adjusted into a predetermined relationship and, additionally, the displacement angle should be stabilized. To this end, in the optical deflector of this working example, the inertia moment $I_2$ of the second movable element 120 with respect to the oscillation axis 104 is made larger than the inertia moment $I_1$ of the first movable element 102 with respect to the oscillation axis 104. By doing so, two natural oscillation frequencies can be easily adjusted to satisfy a desired relationship. This is just the same as described hereinbefore with reference to the embodiment of the present invention. Hence, even if two natural oscillation modes of torsion do not satisfy a desired relationship due to dispersion of shape or the like caused in the manufacture of the optical deflector, for example, by adjusting the inertia moments $I_1$ and $I_2$, these two natural oscillation modes of torsion can be adjusted into a desired frequency relationship.

Furthermore, by making the inertia moment $I_2$ large, the amplitude amplification factor (resonance sharpness Q-value) of the natural oscillation modes is improved. The displacement angle stability is therefore improved by enlarging the inertia moment to increase the amplitude amplification factor thereby to reduce dispersion of oscillation energy.

In the optical deflector of this working example, the length 122 of the second movable element 120 in a direction perpendicular to the oscillation axis 104 may be made shorter than the length 121 of the first movable element 102 in a direction perpendicular to the oscillation axis 104. By doing so, the air resistance of the second movable element 120 is reduced and the displacement angle stability is improved more.

Furthermore, in the optical deflector of this working example, the second movable element 120 is provided by plural components (silicon portion 103, hard magnetic material 108 and copper member 109) while, on the other hand, the first movable element 102 having a reflection surface 107 is provided by a single component. As a result of this, even if the second movable element 120 deforms when the hard magnetic material 108 and the copper member 109 are adhered to the silicon portion 103, it does not cause deformation of the reflection surface 107 of the first movable element 102. Thus, degradation of scanning light spot is avoided.

SECOND WORKING EXAMPLE

Figure 4A:
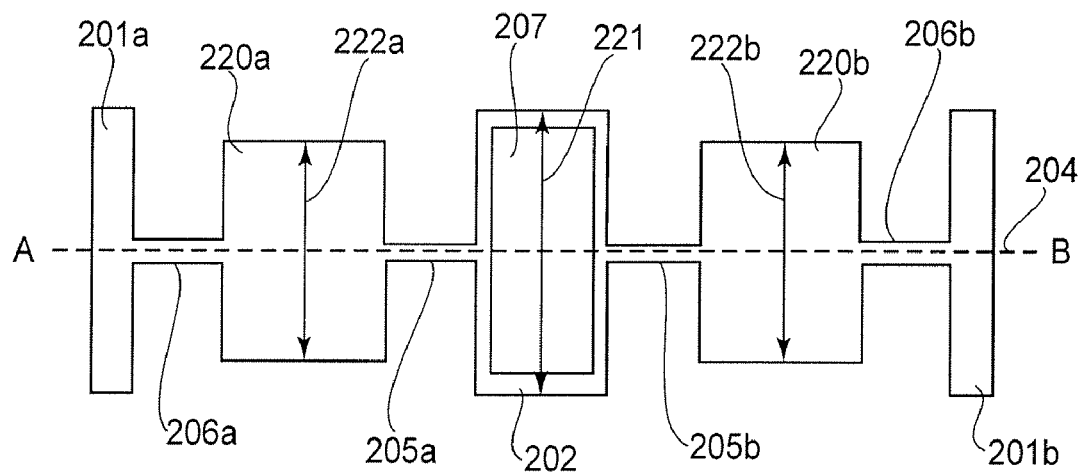
FIG. 4A is a plan view of an optical deflector according to a second working example of the present invention.
Figure 4B:
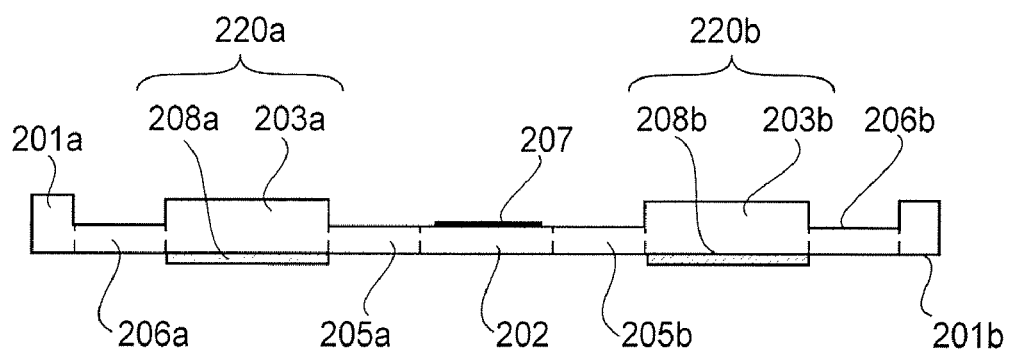
FIG. 4B is a sectional view of the optical deflector of FIG. 4A, taken along a line A-B in FIG. 4A.

Next, an optical deflector according to a second working example of the present invention will be described with reference to FIGS. 4A and 4B. FIG. 4A is a plan view of the optical deflector of this example, and FIG. 4B is a section taken along a line A-B in FIG. 4A. The optical deflector of the second working example has a generally similar structure as the deflector of the first working example but, in this working example, it includes two second movable elements 220a and 220*b* as well as torsion springs 205*a*, 205*b*, 206*a* and 206*b* for resiliently connecting a first movable element 202 having a reflection surface 107 with the second movable elements 220*a* and 220*b*, about an oscillation axis 204. The second movable elements 220*a* and 220*b* have silicon portions 203*a* and 203*b* and film-like permanent magnets 208*a* and 028*b*, respectively.

The optical deflector of this working example has a feature that the second movable elements 220*a* and 220*b* have a thickness larger than the first movable element 202. Furthermore, the silicon portions 203*a* and 203*b* of the second movable elements 220*a* and 220*b* have a thickness larger than the first movable element 202. The first movable element 202 has a thickness 100 µm, while the second movable elements 203*a* and 203*b* have a thickness 200 µm, respectively.

The supporting members 201*a* and 201*b*, first movable element 202, silicon portions 203*a* and 203*b* of the second movable elements 220*a* and 220*b*, and torsion springs 205*a*, 205*b*, 206*a* and 206*b* are all integrally made from a monocrystal silicon substrate. Hence, an optical deflector having a highest machining precision and being small in size, can be produced. These elements can be formed based on photolithography and dry etching of the semiconductor manufacturing method. The film-like permanent magnets 208*a* and 208*b* comprise permanent magnets made of rare earth such as SmCo (samarium cobalt), for example, and these are formed by sputtering or the like.

In the optical deflector of this working example, the silicon portions 203*a* and 203*b* of the second movable elements 220*a* and 220*b* have a thickness larger than the first movable element 202. This assures that, without attaching a metal member or the like having large moment of inertia to the second movable elements 220*a* and 220*b*, the inertia moment of the second movable elements 220*a* and 220*b* can be made larger than that of the first movable element 202. Based on this, the natural oscillation frequencies of torsion can easily be adjusted to satisfy a desired relationship.

Furthermore, in this working example as well, as shown in FIGS. 4A and 4B, the length 222*a* and 222*b* of the second movable elements 220*a* and 220*b* in a direction perpendicular to the oscillation axis 204 is made shorter than the length 221 of the first movable element 202 in a direction perpendicular to the oscillation axis 204. As a result, the air resistance decreases and the displacement angle stability improves. Since in the structure of this working example the movable element is supported at is opposite ends, unwanted oscillation other than the torsional oscillation during the torsional oscillation is avoided more assuredly.

THIRD WORKING EXAMPLE

Figure 5A:
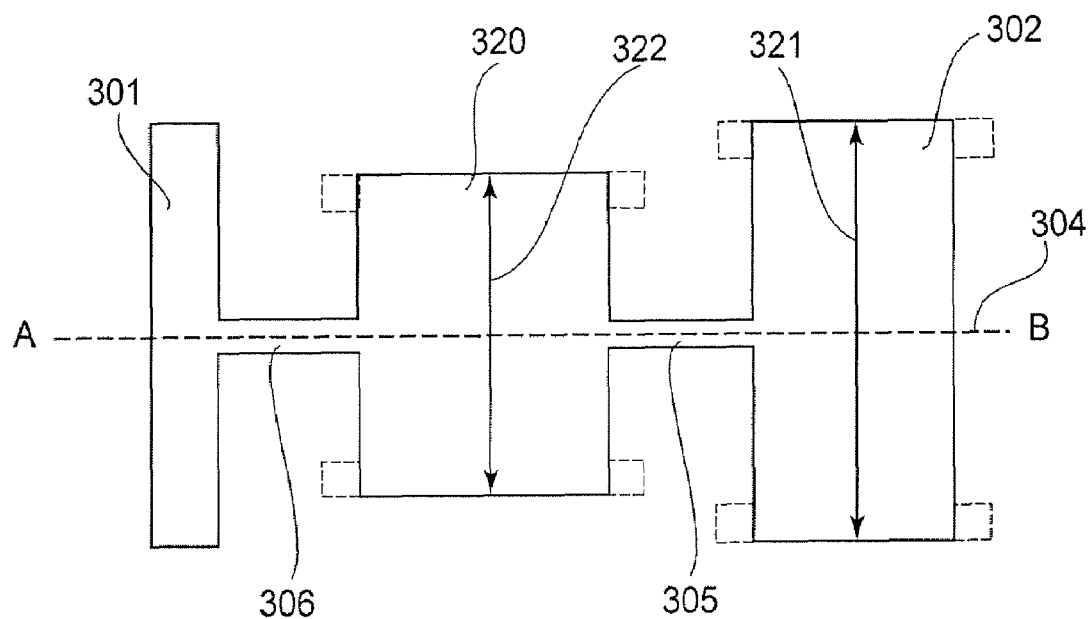
FIG. 5A is a plan view of an optical deflector according to a third working example of the present invention.
Figure 5B:
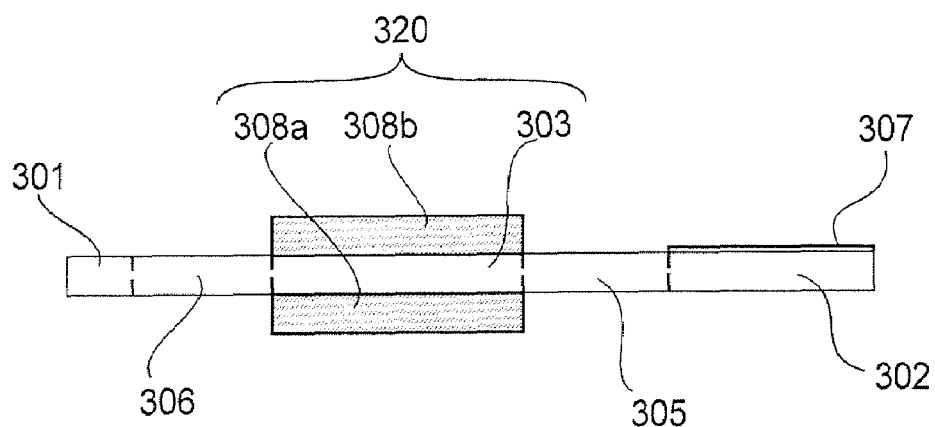
FIG. 5B is a sectional view of the optical deflector of FIG. 5A, taken along a line A-B in FIG. 5A.

Referring to FIGS. 5A and 5B, an optical deflector according to a third working example will be described. FIG. 5A is a plan view of the optical deflector of this example, and FIG. 5B is a section taken along a line A-B in FIG. 5A. The optical deflector of the third working example has a generally similar structure as the deflector of the first working example, but it is different from the first working example in that a second movable element 320 resiliently connected to a supporting member 301 through a torsion spring 306 has a silicon portion 303 and hard magnetic materials 308*a* and 308*b*. These hard magnetic materials 308*a* and 308*b* are a Fe—Cr—Co magnet in this example.

The second movable element 320 of the optical deflector of this working example is equipped with a plurality of hard magnetic materials such as at 308*a* and 308*b* which are disposed sandwiching the oscillation axis 304 therebetween. Since the hard magnetic materials 308*a* and 308*b* are made of Fe—Cr—Co having a large specific gravity, the moment of inertia of the second movable element 320 can easily be made large.

Furthermore, since in this working example the hard magnetic materials 308*a* and 308*b* are disposed at such position as described, it is easy to align the gravity center position of the second movable element 320 with the oscillation axis 304. Hence, unwanted oscillation other than torsional oscillation during the torsional oscillation is avoided more assuredly.

Since hard magnetic material is used for the members 308*a* and 308*b* to enlarge the moment of inertia of the second movable element 320, the required electric current to be applied to the coil for driving the optical deflector is lowered. Thus, an optical deflector operable with lower power consumption is accomplished.

Furthermore, the length 322 of the second movable element 320 in a direction perpendicular to the oscillation axis 304 is made shorter than the length 321, in a direction perpendicular to the oscillation axis 304, of the first movable element 302 connected to the second movable element 320 through a torsion spring 305. As a result, the air resistance decreases, and the displacement angle stability improves.

Furthermore, the optical deflector may take such structure that, when a plane perpendicular to the oscillation axis 304 is defined, at least one of the first and second movable elements 302 and 320 has a shape intersecting with that plane at plural locations. An example is a case wherein, as depicted by thin broken lines in FIG. 5A, some protrusions are provided at the outer peripheral portion of the movable element. An alternative example is that the movable element is formed with s spindle shape that the farther from the oscillation axis 304 the longer the length in a direction parallel to the oscillation axis 304 is. With these structures, the moment of inertia about the oscillation axis 304 can easily be made large. For adjustment of the mass of the movable element, protrusions at the outer peripheral portion may be removed, and this enables efficient mass adjustment. This method can be used in the other working examples.

FOURTH WORKING EXAMPLE

Figure 6A:
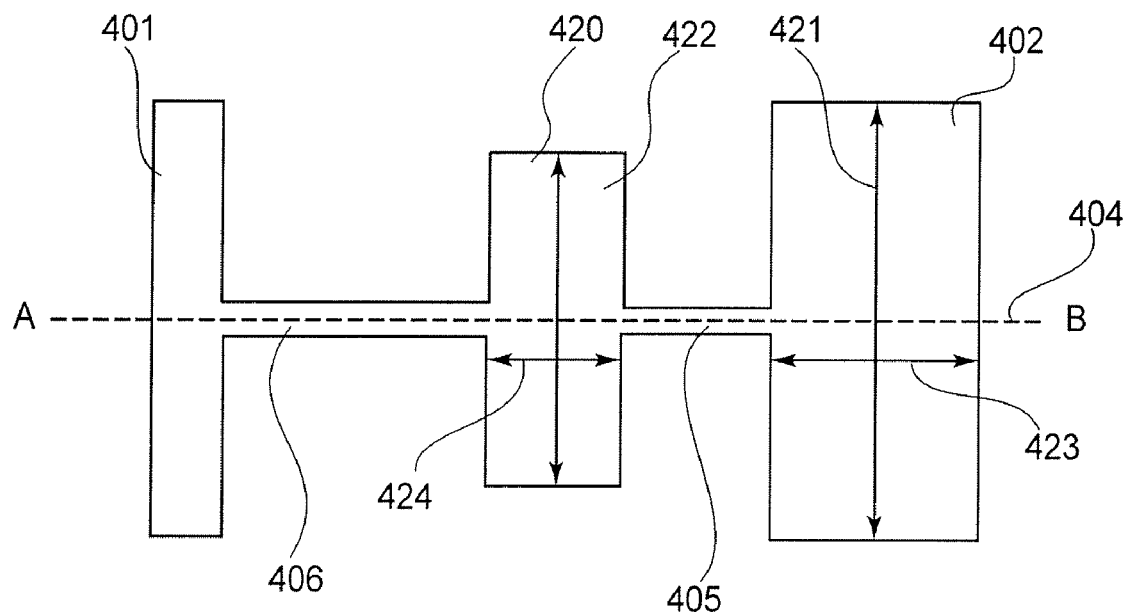
FIG. 6A is a plan view of an optical deflector according to a fourth working example of the present invention.
Figure 6B:
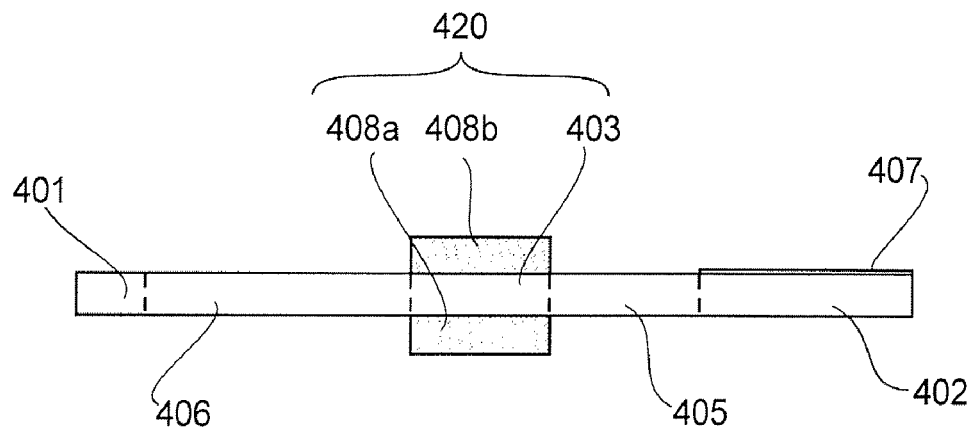
FIG. 6B is a sectional view of the optical deflector of FIG. 6A, taken along a line A-B in FIG. 6A.

Next, referring to FIGS. 6A and 6B, an optical deflector according to a fourth working example of the present invention will be described. FIG. 6A is a plan view of the optical deflector of this example, and FIG. 6B is a section taken along a line A-B in FIG. 6A. The optical deflector of the fourth working example has a generally similar structure as the deflector of the first working example, but it is different from the first working example in that a second movable element 420 resiliently connected to a supporting member 401 through a torsion spring 406 has a silicon portion 403 and hard magnetic materials 408*a* and 408*b*, comprising a Fe—Cr—Co magnet.

Thus, in this working example as well, the moment of inertia of the second movable element 420 resiliently connected to a first movable element 402 through a torsion spring 405 can easily be made large. Furthermore, since in this working example as well a plurality of hard magnetic materials 408*a* and 408*b* are disposed sandwiching the oscillation axis 404, the gravity center position of the second movable element 420 can easily be aligned with the oscillation axis. Therefore, unwanted oscillation other than torsional oscillation during the torsional oscillation is avoided. Additionally, since the required electric current to be applied to the driving unit for driving the optical deflector is lowered, an optical deflector operable with lower power consumption is accomplished.

This working example further differs from the first working example in the following two points: that is, the length 422 of the second movable element 420 in a direction perpendicular to the oscillation axis 404 is made shorter than the length 421 of the first movable element 402 in a direction perpendicular to the oscillation axis 404; and the length 424 of the second movable element 420 in a direction parallel to the oscillation axis 404 is made shorter than the length 423 of the first movable element 402 in a direction parallel to the oscillation axis 404. As a result of this, the air resistance decreases and the displacement angle stability improves.

FIFTH WORKING EXAMPLE

Figure 7:
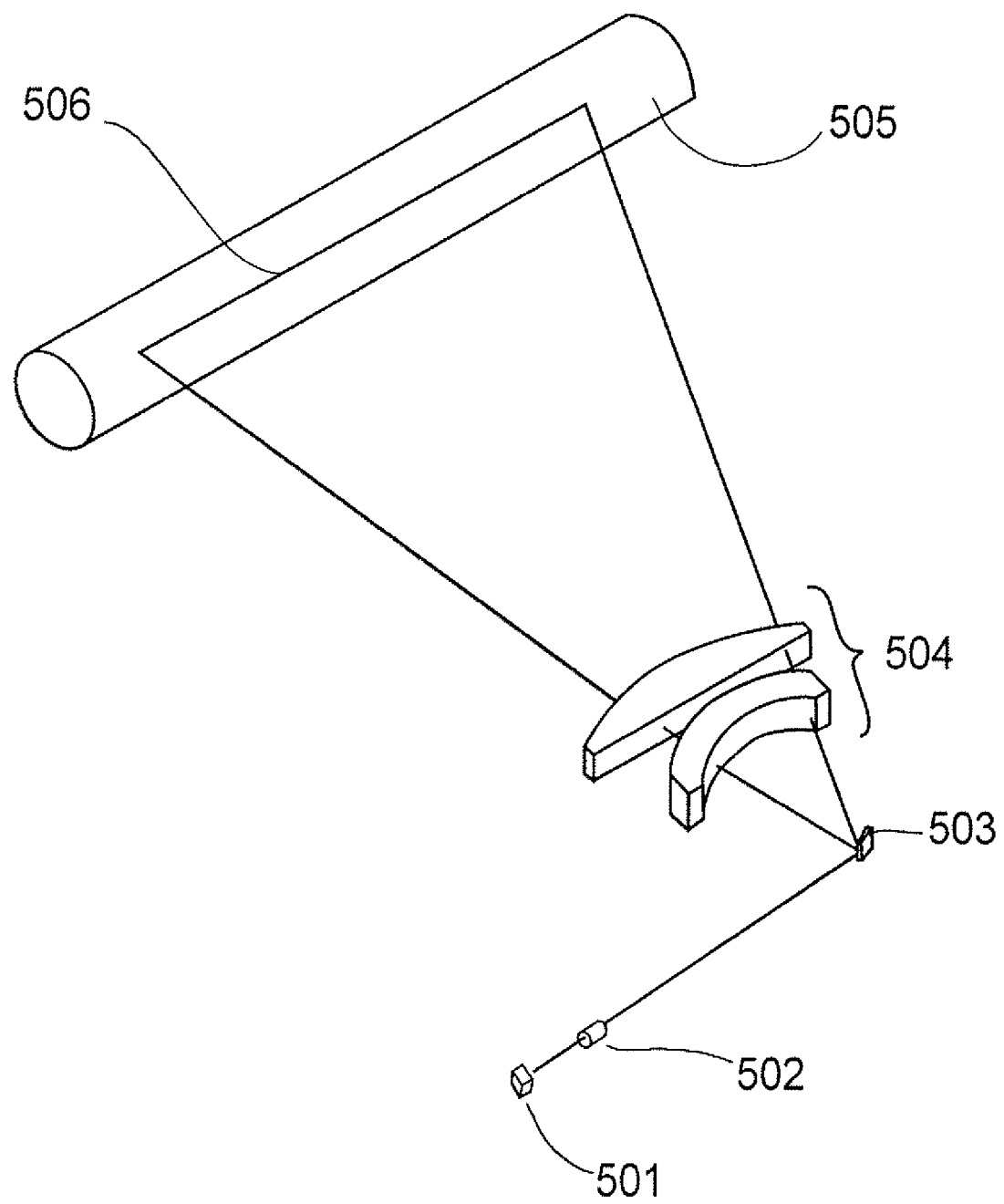
FIG. 7 is a perspective view for explaining an optical instrument according to a fifth working example of the present invention.
Figure 8:
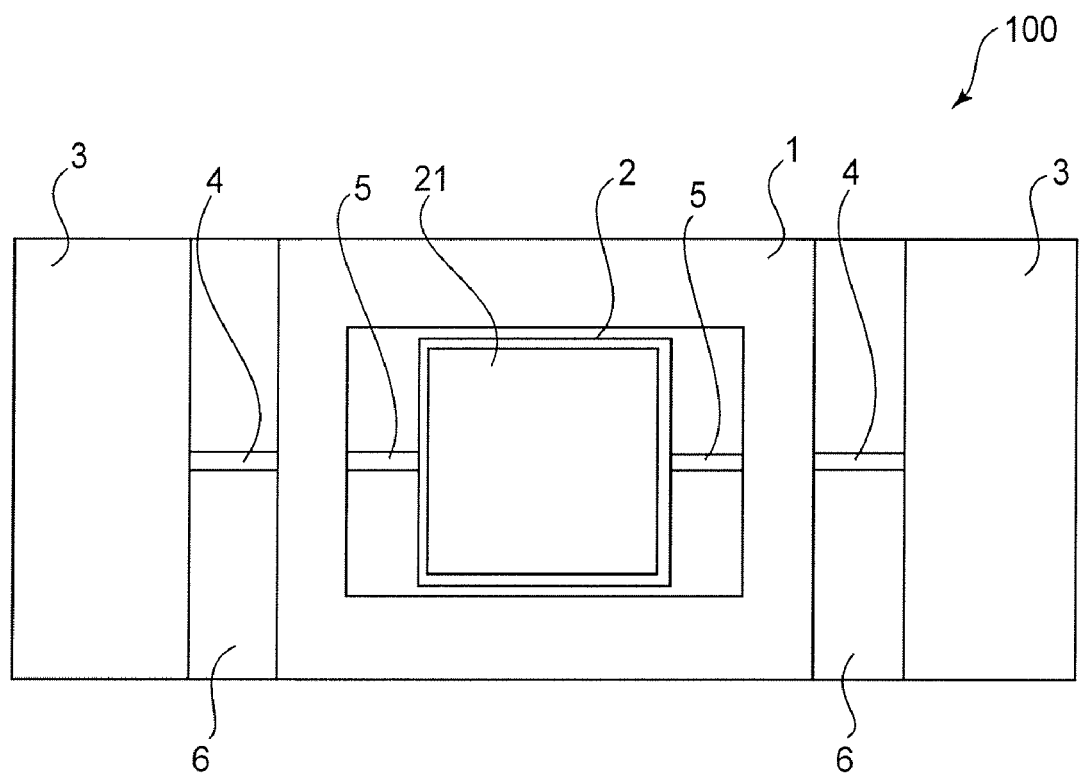
FIG. 8 is a plan view for explaining an actuator of known type.
Figure 9:
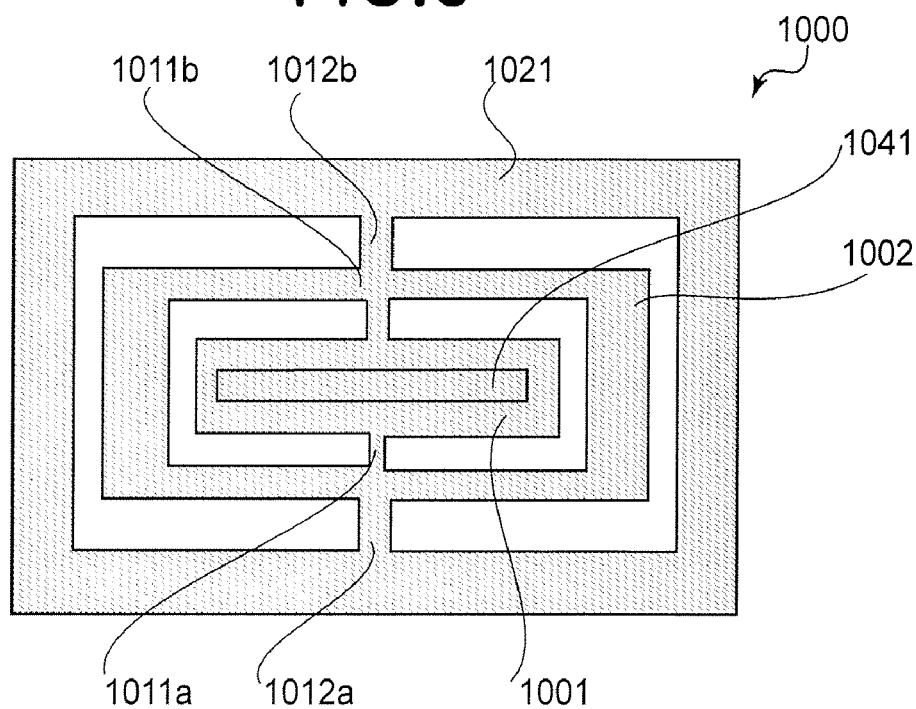
FIG. 9 is a plan view for explaining an oscillator device of known type.

FIG. 7 is a schematic and perspective view, showing a working example of an optical instrument into which an optical deflector according to the present invention is incorporated. In this example, an image forming apparatus is shown as the optical instrument. In FIG. 7, denoted at 503 is an optical deflector according to the present invention, and it functions to one-dimensionally scan the light incident thereon. Denoted at 501 is a laser light source, and denoted at 502 is a lens or lens group. Denoted at 504 is a writing lens or lens group, and denoted at 505 is a drum-shaped photosensitive member. Denoted at 506 is the locus of scan.

A laser beam emitted from the laser light source 501 has been modulated by predetermined intensity modulation related to the timing of deflective scan of light. The intensity-modulated light goes through the lens or lens group 502, and it is one-dimensionally scanningly deflected by means of an optical scanning system (optical deflector) 503. The scanningly deflected laser beam is focused by the wring lens or lens group 504 on the photosensitive member 505 to form an image thereon.

The photosensitive member 505 rotates about a rotational axis in a direction perpendicular to the scan direction, and it is uniformly charged by means of a charger, not shown. By scanning the photosensitive member surface with light, an electrostatic latent image is formed in the scanned surface portion. Subsequently, by using a developing device, not shown, a toner image is produced in accordance with the electrostatic latent image, and the toner image is then transferred to and fixed on a transfer sheet, not shown, whereby an image is produced on the sheet.

With the use of the optical deflector 503 of the present invention, the angular speed of deflective scan of light can be made approximately even within the effective region of the photosensitive member 505 surface. Furthermore, with the use of the optical deflector 503 of the present invention, the operation of the image forming apparatus is stabilized, and a sharp image can be produced thereby.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-149939 filed May 30, 2006, for which is hereby incorporated by reference.

What is claimed is:

1. An optical deflector, comprising:
   a supporting member;
   a first movable element having a light deflecting element;
   at least one second movable element;
   at least one first torsion spring configured to support said first and second movable elements, for torsional oscillation about an oscillation axis;
   at least one second torsion spring configured to support said second movable element and said supporting member, for torsional oscillation about the oscillation axis; and
   a driving system configured to apply a driving force to at least one of said first and second movable elements;
   wherein said optical deflector has at least two natural oscillation modes of different frequencies;
   wherein a moment of inertia of said second movable element with respect to said oscillation axis is larger than a moment of inertia of said first movable element with respect to said oscillation axis,
   wherein a length of said second movable element in a direction perpendicular to the oscillation axis is equal to or less than a length of said first movable element in a direction perpendicular to the oscillation axis, and
   wherein only said second movable element has a permanent magnet.

2. An optical deflector according to claim 1, wherein a length of said second movable element in a direction parallel to the oscillation axis is equal to or less than a length of said first movable element in a direction parallel to the oscillation axis.

3. An optical deflector according to claim 1, wherein said second movable element has a thickness larger than said first movable element.

4. An optical deflector according to claim 1, wherein said second movable element is constituted by a plurality of components.

5. An optical deflector according to claim 4, wherein the components of said second movable elements are disposed sandwiching the oscillation axis therebetween.

6. An optical deflector according to claim 1, wherein said second movable element has a gravity center aligned with the oscillation axis.

7. An optical deflector according to claim 1, wherein said first movable element, said second movable element, said first torsion spring, said second torsion spring and said supporting member are integrally made from monocrystal silicon.

8. An optical deflector according to claim 1, wherein the moment of inertia of said second movable element with respect to the oscillation axis is four times or more as large as the moment of inertia of said first movable element with respect to the oscillation axis.

9. An optical deflector according to claim 1, wherein said driving system is configured to torsionally oscillate said first movable element about the oscillation axis, simultaneously in said at least two natural oscillation modes.

10. An optical deflector according to claim 1, wherein at least one of said first movable element and said second movable element has a plurality of protrusions formed at an end remote from the oscillation axis.

11. An optical instrument, comprising:
    a light source;
    an optical deflector as recited in claim 1; and
    one of a photosensitive member and an image display member;
    wherein said optical deflector is configured to deflect light from said light source and to direct at least a portion of the deflected light onto said photosensitive member or image display member.

* * * * *